(12) United States Patent
Stephenson (10) Patent No.: US 8,853,617 B1
(45) Date of Patent: Oct. 7, 2014

(54) PHOTOMULTIPLIER FOR WELL-LOGGING TOOL

(71) Applicant: Schlumberger Technology Corporation, Sugar Land, TX (US)

(72) Inventor: Kenneth E. Stephenson, Plainsboro, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/829,554

(22) Filed: Mar. 14, 2013

(51) Int. Cl.
  *G01V 5/00* (2006.01)
  *G01V 11/00* (2006.01)
  *H01J 43/10* (2006.01)

(52) U.S. Cl.
  CPC ............... *H01J 43/10* (2013.01); *G01V 11/002* (2013.01)
  USPC .......................................................... 250/256

(58) Field of Classification Search
  CPC ............ H01J 43/20; H01J 43/10; H01J 43/24
  USPC ...................................................... 250/256
  See application file for complete search history.

(56) References Cited

U.S. PATENT DOCUMENTS

| | | | |
|---|---|---|---|
| 4,710,675 A | 12/1987 | Stephenson | |
| 5,523,556 A * | 6/1996 | Meddaugh et al. | 250/214 VT |
| 5,841,231 A | 11/1998 | Kimura et al. | |
| 6,462,324 B1 * | 10/2002 | Wright et al. | 250/207 |
| 7,427,752 B2 * | 9/2008 | Jones et al. | 250/299 |
| 7,741,758 B2 * | 6/2010 | Hanai et al. | 313/103 CM |
| 2006/0145054 A1 * | 7/2006 | Hanai et al. | 250/207 |
| 2006/0232205 A1 * | 10/2006 | Hanai et al. | 313/528 |
| 2008/0061690 A1 | 3/2008 | Ohmura et al. | |
| 2011/0186721 A1 | 8/2011 | Galford | |
| 2011/0240857 A1 * | 10/2011 | Kovtoun et al. | 250/336.1 |

FOREIGN PATENT DOCUMENTS

WO  2012067954 A2  5/2012

OTHER PUBLICATIONS

Ostankov et al., "A study of the new hemispherical 6-dynodes PMT from electron tubes," 2000, Nuclear Instruments and Methods in Physics Research A, vol. 442, pp. 117-123.*
Seiler, H., "Secondary electron emission in the scanning electron microscope", Journal of Applied Physics, vol. 54, R1, 1983, 18 pages.
International Search Report & Written Opinion issued in PCT/US2014/017548 on Jun. 2, 2014; 14 pages.

* cited by examiner

*Primary Examiner* — Kiho Kim
(74) *Attorney, Agent, or Firm* — Cathy Hewitt; Jeremy Berman (57) ABSTRACT

A photomultiplier includes a tube and plurality of dynodes within the tube and including at least one first dynode and at least one second dynode. A respective insulator is between adjacent pairs of dynodes. The at least one first dynode includes a conductive outer ring and a medial conductive member coupled to the conductive outer ring in spaced relation therefrom. The at least one second dynode includes a conductive outer ring and a conductive inner ring supported within the conductive outer ring.

23 Claims, 12 Drawing Sheets

PHOTOMULTIPLIER FOR WELL-LOGGING TOOL

BACKGROUND

A photomultiplier is often optically coupled to a scintillator and incorporated into a well-logging tool to measure radiation within the wellbore. A scintillator crystal emits visible or near-visible light in response to the detected radiation. The photomultiplier receives the light from the scintillator crystal and transforms that light into electrical pulses. The frequency and amplitude of the pulses are related to the radiation measured during well-logging. In the photomultiplier, the electrons are amplified by a linear arrangement of electrodes called dynodes that accelerate and focus the electrons. This linear arrangement of electrodes is termed a venetian blind dynode structure and it is considered to resist the vibration and high heat in well-logging better than other dynode structures, such as a box-type dynode structure.

In the venetian blind dynode structure, the first dynode intercepts about 80% of the incident electrons. Many of the intercepted electrons, however, produce secondary electrons that may be poorly collected by subsequent dynodes.

SUMMARY

This summary is provided to introduce a selection of concepts that are further described below in the detailed description. This summary is not intended to identify key features of the claimed subject matter, nor is it intended to be used as an aid in limiting the scope of the claimed subject matter.

A photomultiplier includes a tube and plurality of dynodes within the tube and includes at least one first dynode and at least one second dynode. A respective insulator is positioned between adjacent pairs of dynodes. The at least one first dynode includes a conductive outer ring and a medial conductive member coupled to the conductive outer ring in spaced relation. The at least one second dynode includes a conductive outer ring and a conductive inner ring supported within the conductive outer ring.

In another example, a well-logging tool to be positioned in a wellbore of a subterranean formation includes a tool housing and a photomultiplier carried by the tool housing. The photomultiplier includes a tube and a plurality of dynodes within the tube and including at least one first dynode and at lease one second dynode. A respective insulator is positioned between adjacent pairs of dynodes. The at least one first dynode includes a conductive outer ring and a medial conductive member coupled to the conductive outer ring in spaced relation. The at least one second dynode includes a conductive outer ring and a conductive inner ring supported within the conductive inner ring.

A method of multiplying a signal in a photomultiplier is disclosed and the photomultiplier includes a tube containing a plurality of dynodes and including at least one first dynode and at least one second dynode and a respective insulator is positioned between adjacent pairs of dynodes. The method includes collecting electrons at the first dynode, which includes a conductive outer ring and a medial conductive member coupled to the conductive outer ring in spaced relation. The method further includes conducting electrons at the second dynode that includes a conductive outer ring and a conductive inner ring supported within the conductive outer ring.

DETAILED DESCRIPTION

Different embodiments will now be described more fully hereinafter with reference to the accompanying drawings. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
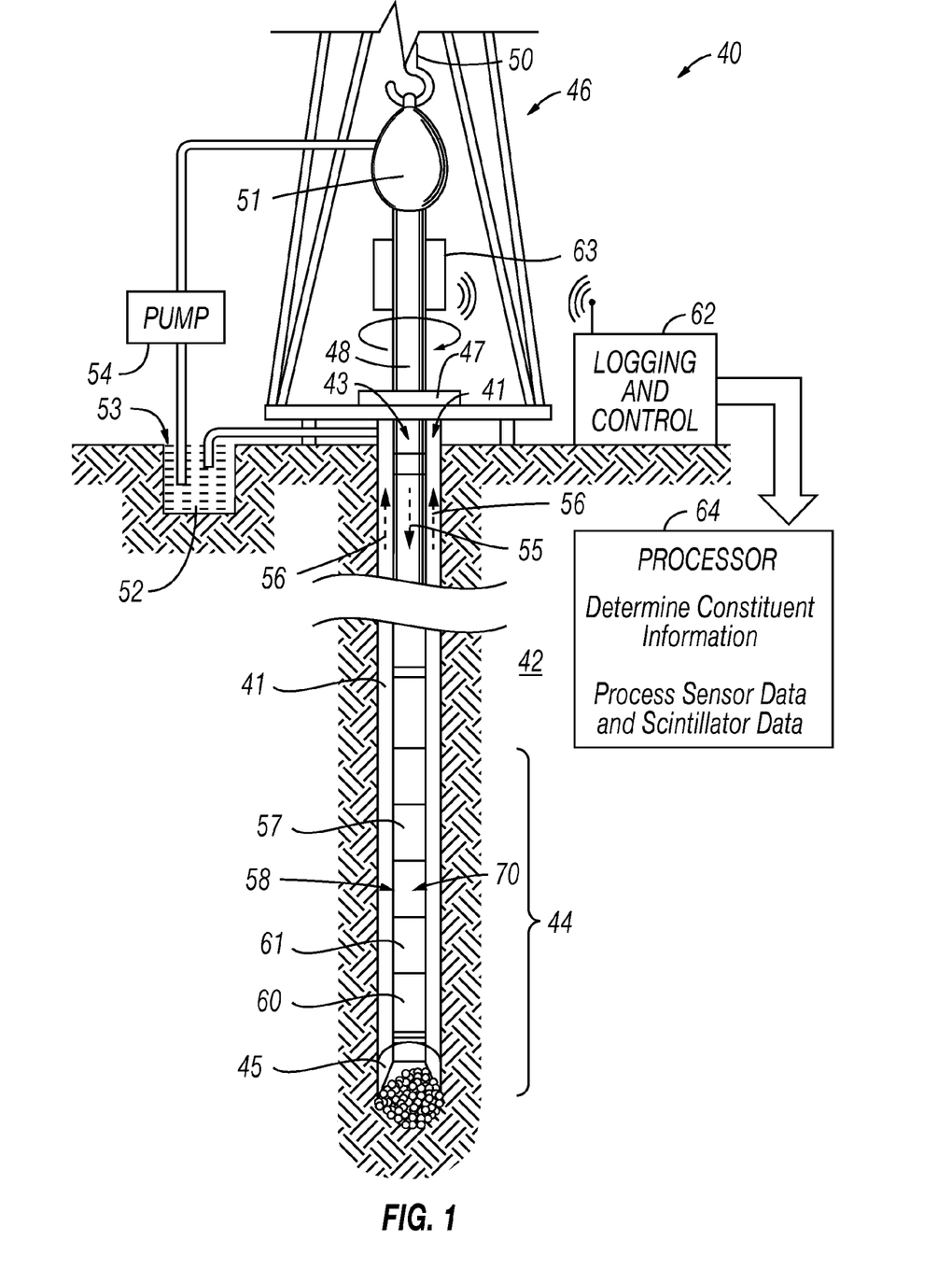
FIG. 1 is a schematic diagram illustrating a well-logging system in accordance with an example embodiment.

FIG. 1 illustrates a well site system 40 in which various embodiments of a photomultiplier 76 coupled to a scintillator 74 and as described below may be implemented. In the illustrated example, the well site is a land-based site, but the techniques described herein may also be used with a water or offshore-based well site as well. In this example system, a borehole 41 is formed in a subsurface or geological formation 42 by rotary drilling, for example. Some embodiments may also use directional drilling, as will be described below.

Although this description proceeds with the description of a Drilling and Measurement (D&M) system that includes a drill string, it should be understood that a wireline drilling and logging system may be used and slickline or other tubing conveyance. The radiation detector as described below may be used with either system.

A drill string 43 is suspended within the wellbore, also termed borehole 41, and has a bottom hole assembly ("BHA") 44 which includes a drill bit 45 at its lower end. The system 40 further includes a platform and derrick assembly 46 positioned over the borehole 41. The assembly 46 illustratively includes a rotary table 47, kelly 48, hook 50 and rotary swivel 51. The drill string 43 in this example may be rotated by the rotary table 47, which engages the kelly 48 at the upper end of the drill string. The drill string 43 is illustratively suspended from the hook 50, which is attached to a traveling block (not shown). The kelly 48 and the rotary swivel 51 permits rotation of the drill string relative to the hook. A top drive system (not shown) may also be used to rotate and axially move the drill string 43, for example.

In the present example, the system 40 may further include drilling fluid or mud 52 stored in a pit 53 formed at the well site (or a tank) for such purpose. A pump 54 delivers the drilling fluid 52 to the interior of the drill string 43 via a port in the swivel 51, causing the drilling fluid to flow downwardly through the drill string as indicated by the directional arrow 55. The drilling fluid exits the drill string 43 via ports or nozzles (not shown) in the drill bit 45, and then circulates upwardly through an annular space ("annulus") between the outside of the drill string and the wall of the borehole, as indicated by the directional arrows 56. The drilling fluid lubricates the drill bit 45 and carries formation cuttings up to the surface as it is cleaned and returned to the pit 53 for recirculation.

The BHA 44 of the illustrated embodiment may include a logging-while-drilling ("LWD") module 57, a measuring-while-drilling ("MWD") module 58, a rotary steerable directional drilling system and motor 60, and the drill bit 45. These modules are part of downhole tubulars formed from respective housings as illustrated.

The LWD module 57 may be housed in a special type of drill collar, as is known in the art, and may include one or more types of well-logging instruments, including example radiation detectors. It will also be understood that optional LWD and/or MWD modules may also be used in some embodiments, including a well-logging tool indicated generally at 58 that includes a tool housing 70 used to contain the photomultiplier 76. (References, throughout, to a module at the position of 57 may mean a module at the position of 61 as well). The LWD module 57 may include capabilities for measuring, processing, and storing information, as well as for communicating the information with the surface equipment, e.g., to a logging and control unit 62, which may include a computer and/or other processors for decoding information transmitted from the MWD and LWD modules 57, 58 and recording and calculating parameters therefrom. The information provided by the MWD and LWD modules 57, 58 may be provided to a processor 64 (which may be off site, or in some embodiments may be on-site as part of the logging and control unit 62, etc.) for determining volumetric and other information regarding constituents within the geological formation 42 and process sensor data collected from sensors located in different modules.

A wireline cable may be used instead that includes a standard cable head connected at its lower end to a logging tool with a wireline cable extending to the surface of the borehole. During a logging operation, data may be transmitted from the logging tool to the wireline cable through the cable head and into the logging and control system 62 such as shown in FIG. 1. The downhole tubular may include one or more pressure bulkheads that enclose a protected area as an enclosure for a module and contain the electronic devices such as the photomultiplier in accordance with a non-limiting example and connected to the scintillator 74 and photomultiplier 76 to form a radiation detector, including sensors for downhole logging and processors and other electronics. The bulkhead may form a pressure housing as part of the downhole tubular.

Figure 2:
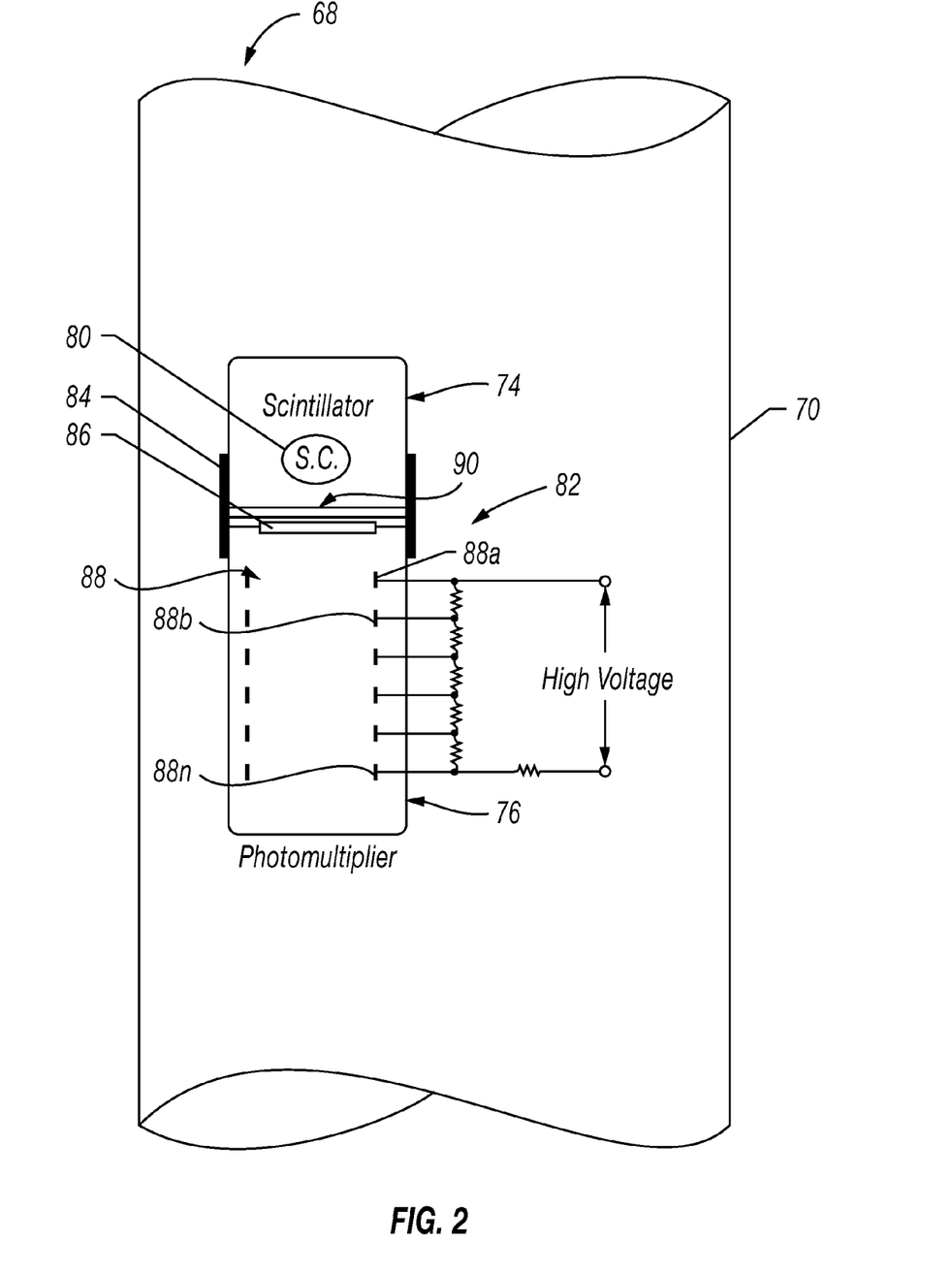
FIG. 2 is a schematic diagram of a portion of a well-logging tool carrying a radiation detector having a scintillator optically coupled to a photomultiplier to show basic operational principles in accordance with an example embodiment.

FIG. 2 shows a portion of a well-logging tool 68 to be positioned in a wellbore of a subterranean formation and showing a tool housing 70 that may be part of a LWD and/or MWD module as described above and used for well-logging and other applications. A scintillator 74 is optically coupled to a photomultiplier 76. A scintillation crystal (SC) 80 detects radiation and generates light pulses that are collected by the photomultiplier 76 formed as a tube in this example. The scintillator 74 and photomultiplier 76 are optically coupled together to form a scintillator package 82. Radiation interacts with the scintillation crystal 80 and emits photons in the visible or near visible region of the electromagnetic spectrum. The scintillator crystal 80 may be formed from organic crystals, inorganic crystals or plastic phosphors. The scintillator 74 and photomultiplier 76 as a package 82 are held together using a separate mechanical support 84 that could be formed as a cylindrical sleeve or a larger housing enclosing both the scintillator 74 and photomultiplier 76. In one example, the photomultiplier 76 is formed by a vacuum tube with a glass envelope containing a photocathode 86 and a series of electrodes called dynodes 88. In another example, the vacuum tube is composed of a brazed ceramic and metal structure.

An optical window 90 couples the scintillator with the photomultiplier (FIG. 2). Light from the scintillator crystal 80 liberates electrons from the photocathode 86 by the photoelectric effect. In the photomultiplier, the electrons are attracted by a voltage drop to the nearest dynode shown at 88$a$ to which the photoelectrons strike and liberate new electrons for each photoelectron. These subsequently released electrons are attracted to a second dynode shown at 88$b$ where a larger third-generation group of electrons is emitted. This continues through a number of stages within this photomultiplier in FIG. 2 that shows successive stages of the dynodes. At the final dynode 88$n$, sufficient electrons produce a pulse of sufficient magnitude for further amplification and electronic processing.

The photomultiplier 76 may be formed from an evacuated glass housing with a high vacuum to house the photocathode 86 and the multiple dynodes 88. The photons from the scintillator crystal 80 strike the photocathode 86, which may be formed separate as shown in FIG. 2 or as a thin deposit on the optical window 90 producing electrons that strike the first dynode. Each dynode is at a more positive voltage than the previous dynode. As electrons move towards the first dynode 88$a$, they are accelerated by the electric field and arrive with greater energy at the next, subsequent dynode. When the electrons strike the first dynode 88$a$, lower energy electrons are emitted, which in turn are accelerated towards the second dynode 88$b$. The serial arrangement of the dynodes allows cascading of an ever-increasing number of electrons at each stage. The accumulated charge results in a sharp current pulse output from the photomultiplier that can be electronically processed. In one example, the optical window 90 may be braised or mechanically fastened to a flange on the mount 84 formed as a sleeve or larger housing. The scintillator 74 may be inserted through one end of the sleeve 84 or housing. The scintillator crystal 80 may be formed from a hydroscopic crystal composition as known to those skilled in the art. This scintillator 74 is not limited to the use of hydroscopic scintillator crystals, but non-hydroscopic scintillator crystals may be used.

As explained in greater detail with reference to FIG. 5 below, an insulator is positioned between adjacent pairs of dynodes. This is also known as a washer/insulator dynode structure because the insulator is formed similar to a washer or ring. A grid associated with each dynode increases the electric field to enhance collection of secondary electrons from the previous dynode and reduce a potential barrier on the dynode to which it is associated. Each multiplication stage in the photomultiplier 76 includes a dynode and a grid with the dynode providing the multiplication through the secondary electron emission and the grid providing a low electric field region upstream of the dynode. The grid from the next stage provides a high electric field region downstream of the dynode. These low and high electric fields on each side of a dynode provide the extracting force for the secondary electrons emitted at the dynode surface so that they may leave the dynode and reach the next dynode stage.

As noted before, the linear structure of the dynodes allows cascading with an ever-increasing number of electrons produced at each multiplication stage. This linear structure as shown in FIG. 2 has a structure that is rugged and appropriate to a well-logging environment. This type of design intercepts about 80% of the incident photoelectrons and the intercepted electrons produce secondary electrons that are inefficiently collected by the subsequent dynode because the dynode intercepts 80% of the secondary electrons in dynode geometry.

Figure 3:
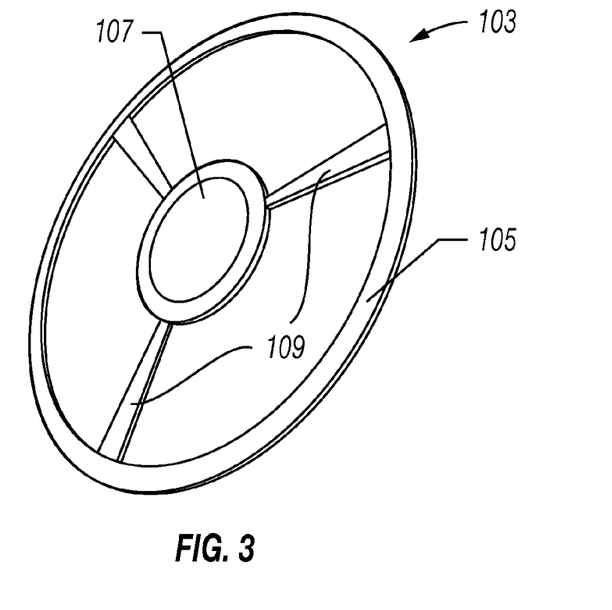
FIG. 3 is a perspective view of a dynode that may be used in the photomultiplier of FIG. 2 as the odd-numbered dynodes in accordance with a non-limiting example.
Figure 4:
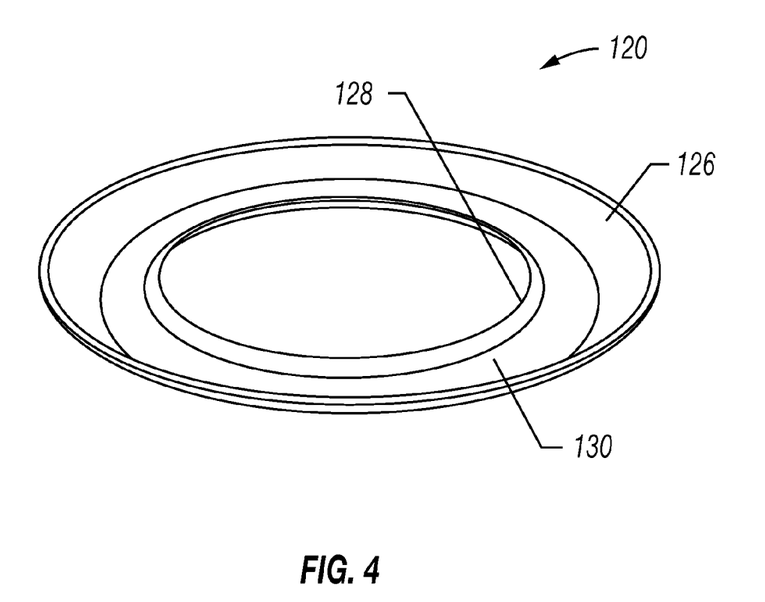
FIG. 4 is a perspective view of a dynode embodiment that may be used as the even-numbered dynodes in accordance with a non-limiting example.
Figure 5:
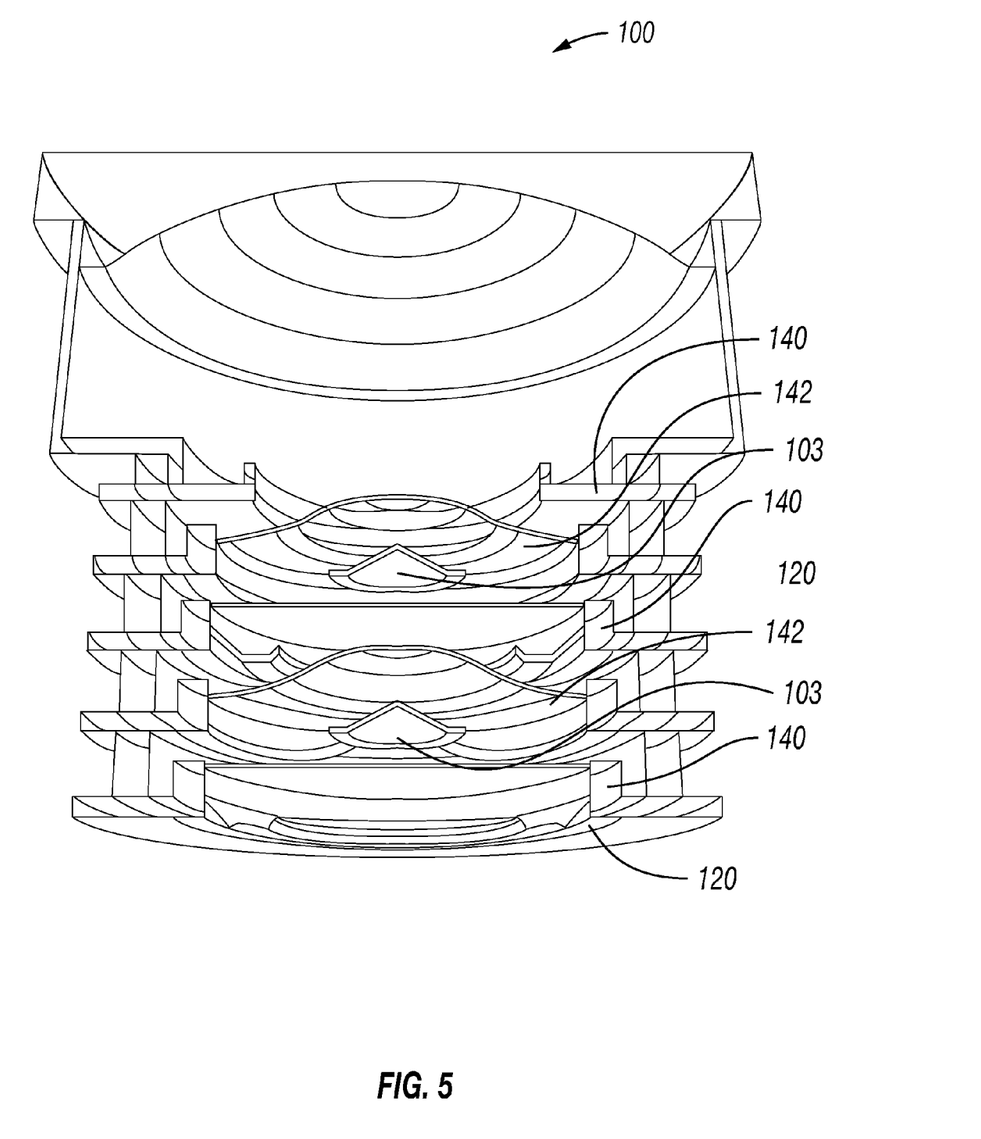
FIG. 5 is a cross-section in perspective of a photomultiplier using the dynodes of FIGS. 3 and 4 in accordance with a non-limiting example.

A dynode structure in accordance with a non-limiting example is shown in the photomultiplier 100 of FIG. 5 and forces secondary electrons to move back and forth radially from one dynode to the next. FIGS. 3 and 4 show a respective dynode pair that is repeated in the photomultiplexer. FIG. 3 shows an example of the odd-numbered dynodes 103 starting with the first dynode that intercepts the electrons. The even-numbered dynodes 120 starting with the second dynode are shown in FIG. 4. This first dynode 103 of each dynode pair includes a conductive outer ring 105 and a medial conductive member 107 coupled to the conductive outer ring 105 and in spaced relation therefrom. This first dynode 103 includes at least one conductive radial support 109 coupled between the medial conductive member and an adjacent portion of the conductive outer ring 105. Three radial supports 109 are illustrated in the example of FIG. 3. The medial conductive member 107 in this example has a conical shape.

The second dynode 120 of each dynode pair is formed as a conductive outer ring 122 and a conductive inner ring 124 supported within the conductive outer ring 122. This second dynode 120 of each dynode pair as shown in FIG. 4 includes a radially outermost sloped ring segment 126 extending in a first longitudinal direction, a radially innermost sloped ring segment 128 extending in a second longitudinal direction, and an intermediate flat ring segment 130 extending between the radially outermost and radially inner most ring segments.

Figure 6:
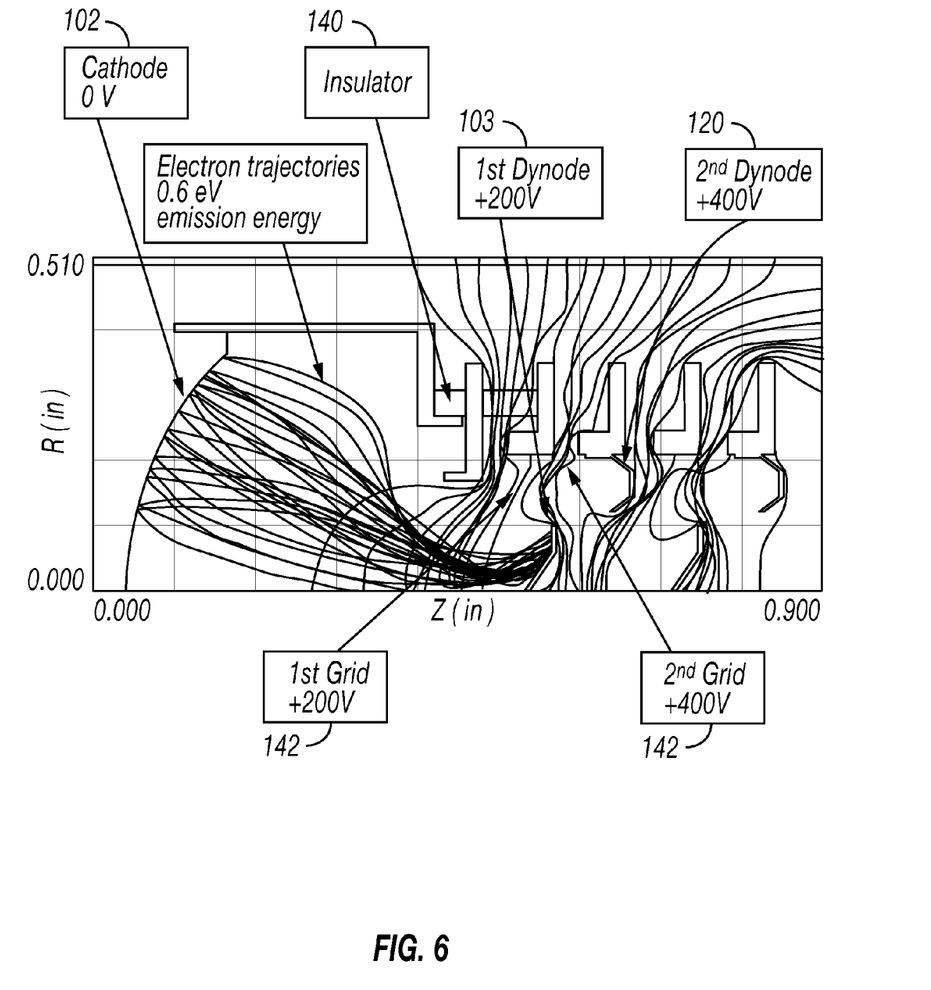
FIG. 6 is a graph showing the trajectory for photoelectrons having an energy of about 0.6 eV and showing a cathode, insulator, first grid, first dynode, second grid, and second dynode and the respective applied voltages in accordance with a non-limiting example.

As shown in FIG. 5, a plurality of the odd numbered ones of the first dynode 103 are alternated with a plurality of even-numbered ones of the second dynode 120. Although the base material of dynodes 103 and 120 is conductive, in practice, the surface of these dynodes is coated with a high secondary emissive material, such as BeO. Examples of the base material include copper beryllium alloy or nickel beryllium alloy. The surface of these may be oxidized to form a BeO secondary emissive layer. An insulator 140 as a washer or ring is positioned between adjacent pairs of dynodes. A conductive grid 142 is between adjacent ones of the plurality of dynodes as shown in FIG. 5. This configuration is also schematically illustrated in the graph of FIG. 6, showing the photocathode 102 at zero volts, the insulator 140 followed by a grid 142 and followed by a first dynode 103 (FIG. 3), a second grid 142 and the second dynode 120 (FIG. 4). The grid material may be, for example, nickel or stainless steel mesh that is formed to the shape shown.

Figure 7:
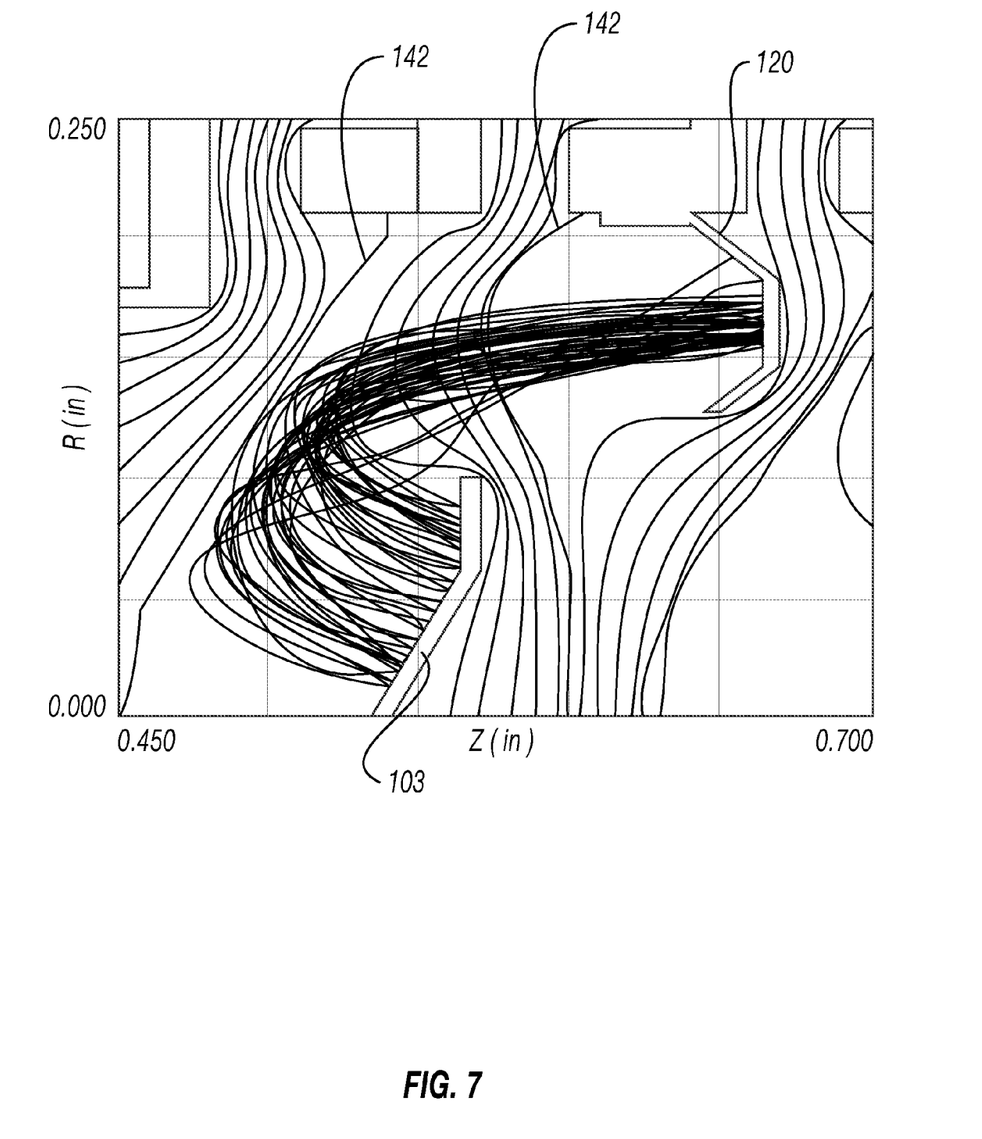
FIG. 7 is a graph showing the trajectory of secondary electrons with 0.1 eV energy from the first dynode in accordance with a non-limiting example.
Figure 8:
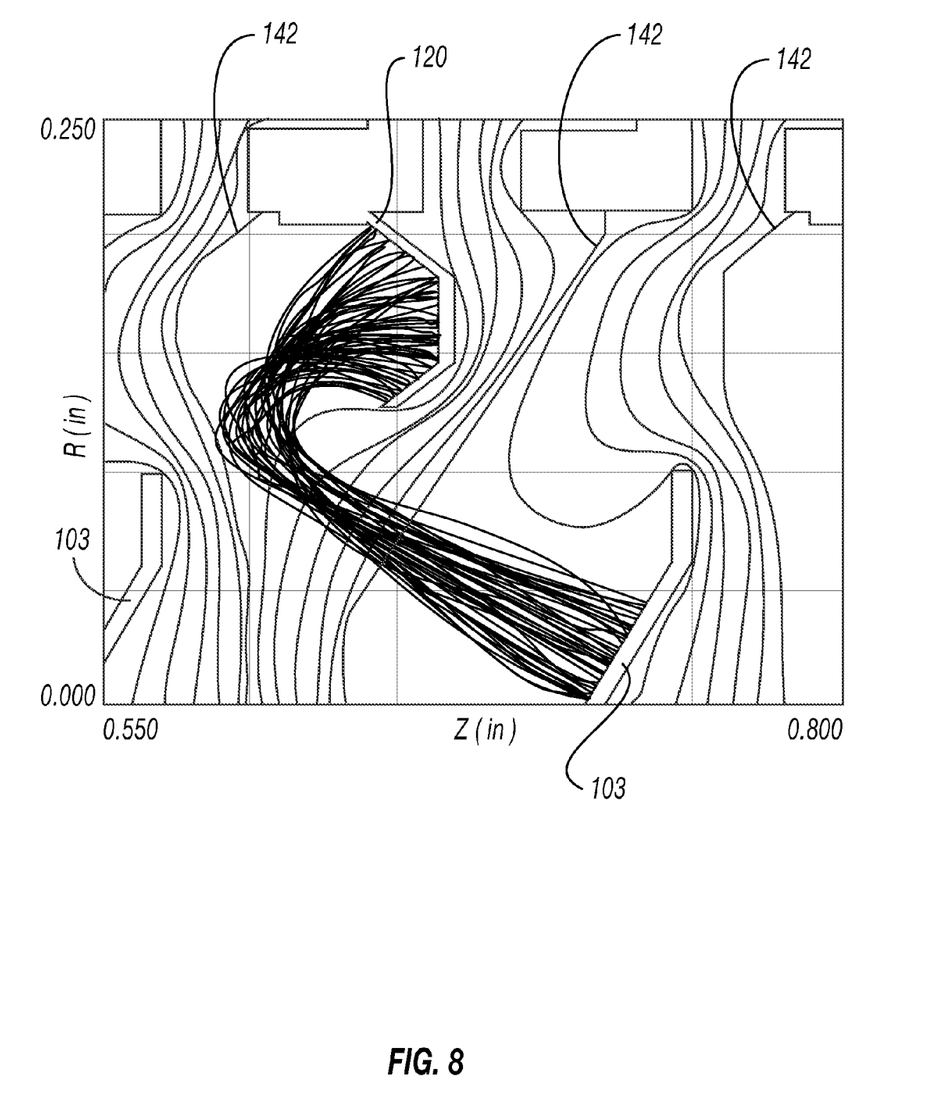
FIG. 8 is a graph showing the trajectory of secondary electrons with 0.1 eV energy from the second dynode in accordance with a non-limiting example.

The graph of FIG. 6 shows the trajectories for photoelectrons with an energy of 0.6 eV emission energy. Secondary electrons with 0.1 eV energy are shown at the graphs of FIGS. 7 and 8 with the secondary electrons from the first dynode 103 shown in the graph of FIG. 7 and the secondary electrons from the second dynode 120 shown in the graph of FIG. 8. The structure is symmetrical azimuthally along its axis and plotted in the r-z space. With these energies of the electrons, the photoelectrons and secondary electrons are intercepted by the appropriate dynode. The pattern shown for the first and second dynodes 103, 120 is repeated to construct as many stages of gain as desired.

The radial supports 109 configured as "arms" in the first dynode 103 of FIG. 3 do not intercept the secondary electrons and do not substantially reduce the collection efficiency because the secondary electrons are accelerated away from the arms, which are at the same potential as the surface from which the electrons are leaving towards the grid of the next dynode, which is at a positive potential with respect to its emitting surface.

Figure 9:
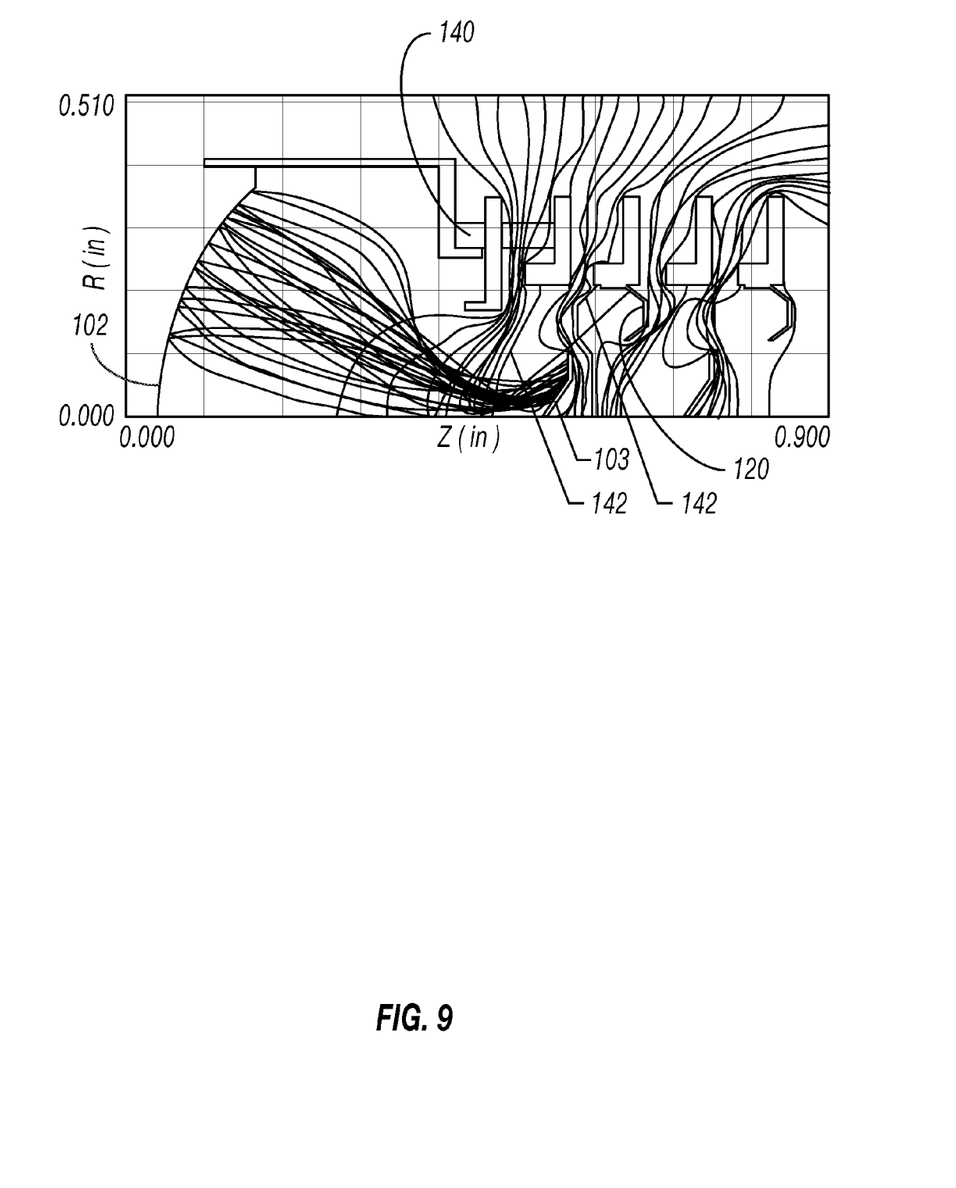
FIG. 9 is a graph showing structural components similar to those shown in FIG. 6 with the trajectories for the electrons emitted from a photocathode that are less than 1 eV in accordance with a non-limiting example.
Figure 10:
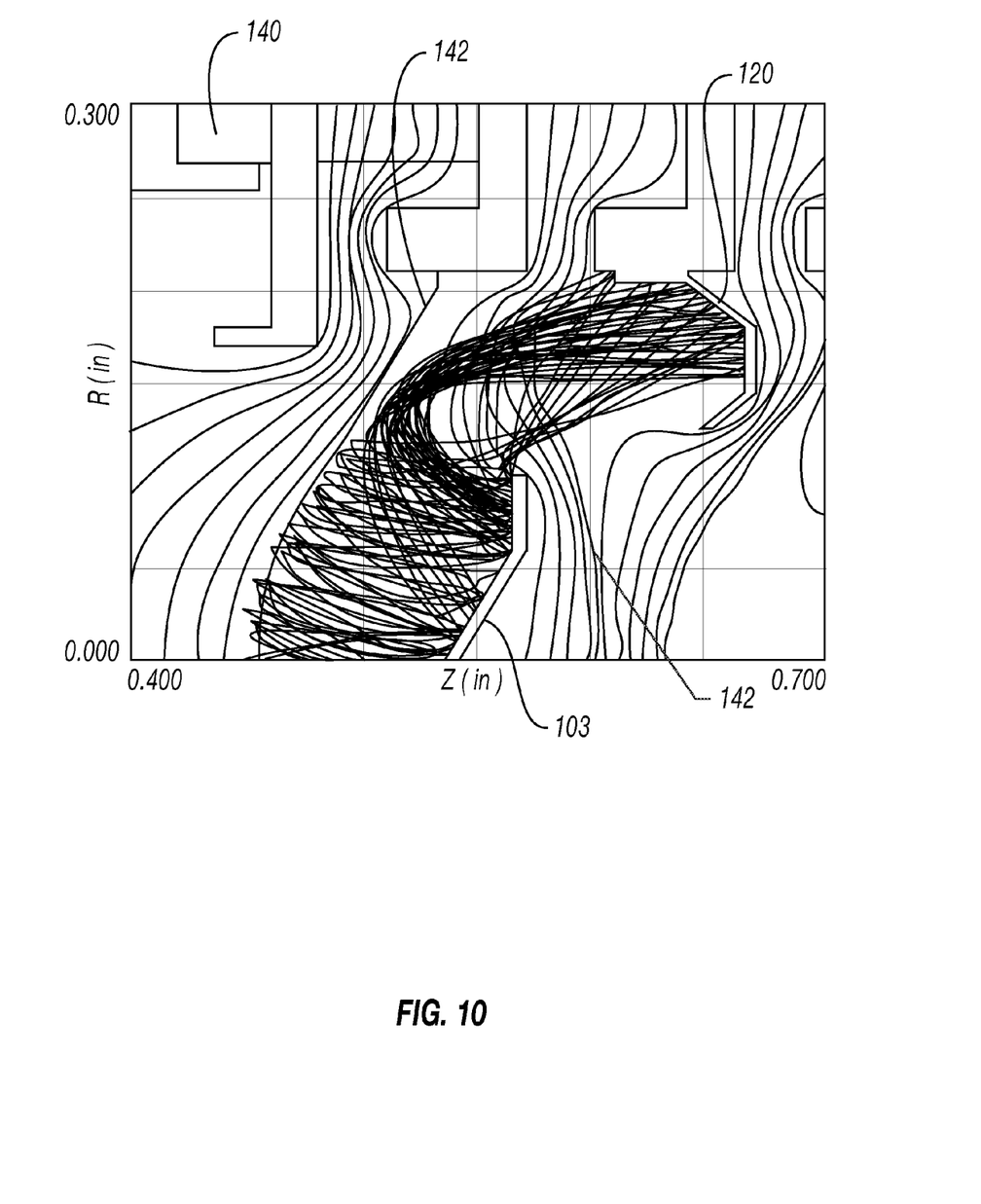
FIG. 10 is a graph showing the trajectories of 10 eV secondary electrons at the first dynode in accordance with a non-limiting example.
Figure 11:
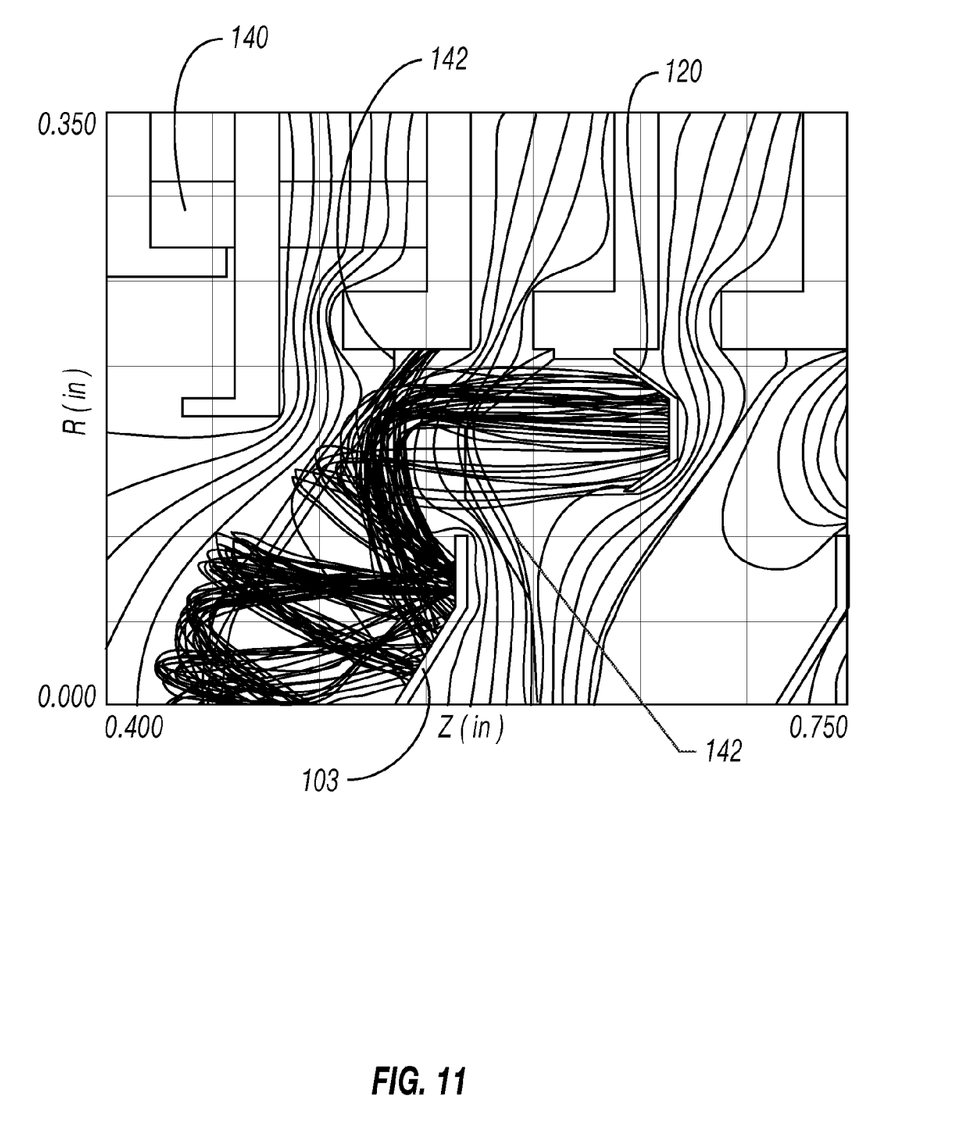
FIG. 11 is a graph showing the trajectories of 100 eV secondary electrons at the first dynode in accordance with a non-limiting example.

The energy of the photoelectrons could be less than 1 eV and the electron trajectories for this energy from the photocathode are shown in FIG. 9. With the exception of a few photoelectrons emitted at divergent angles near the edge of the cathode 102, trajectories are intercepted by the first dynode 103. Secondary electrons from the dynodes, however, have a wide range of energies and the secondary electrons to be directed to the next dynode, or for the higher secondary electron energies, to be reflected back to the dynode surface enable the generation of additional secondary electrons. The graph in FIG. 10 shows the trajectories of 10 eV secondary electrons from the first dynode 103. With a few exceptions, the trajectories are either directed onto the second dynode 120 or reflected back to the first dynode 103 for re-emission. A similar effect is shown with the 100 eV secondary electrons from the first dynode 103 as shown in the graph of FIG. 11.

Figure 12:
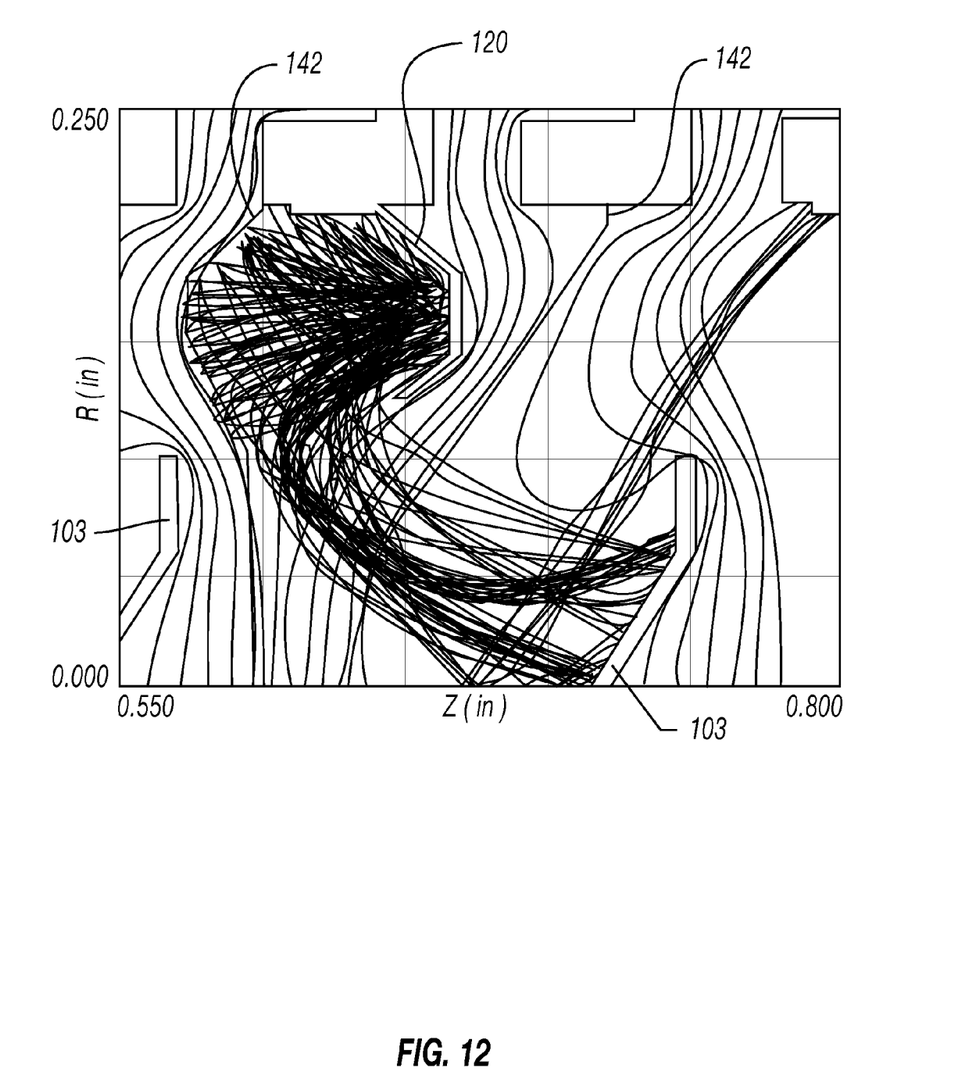
FIG. 12 is a graph showing secondary electron trajectories for 10 eV emission energies from the second dynode in accordance with a non-limiting example.
Figure 13:
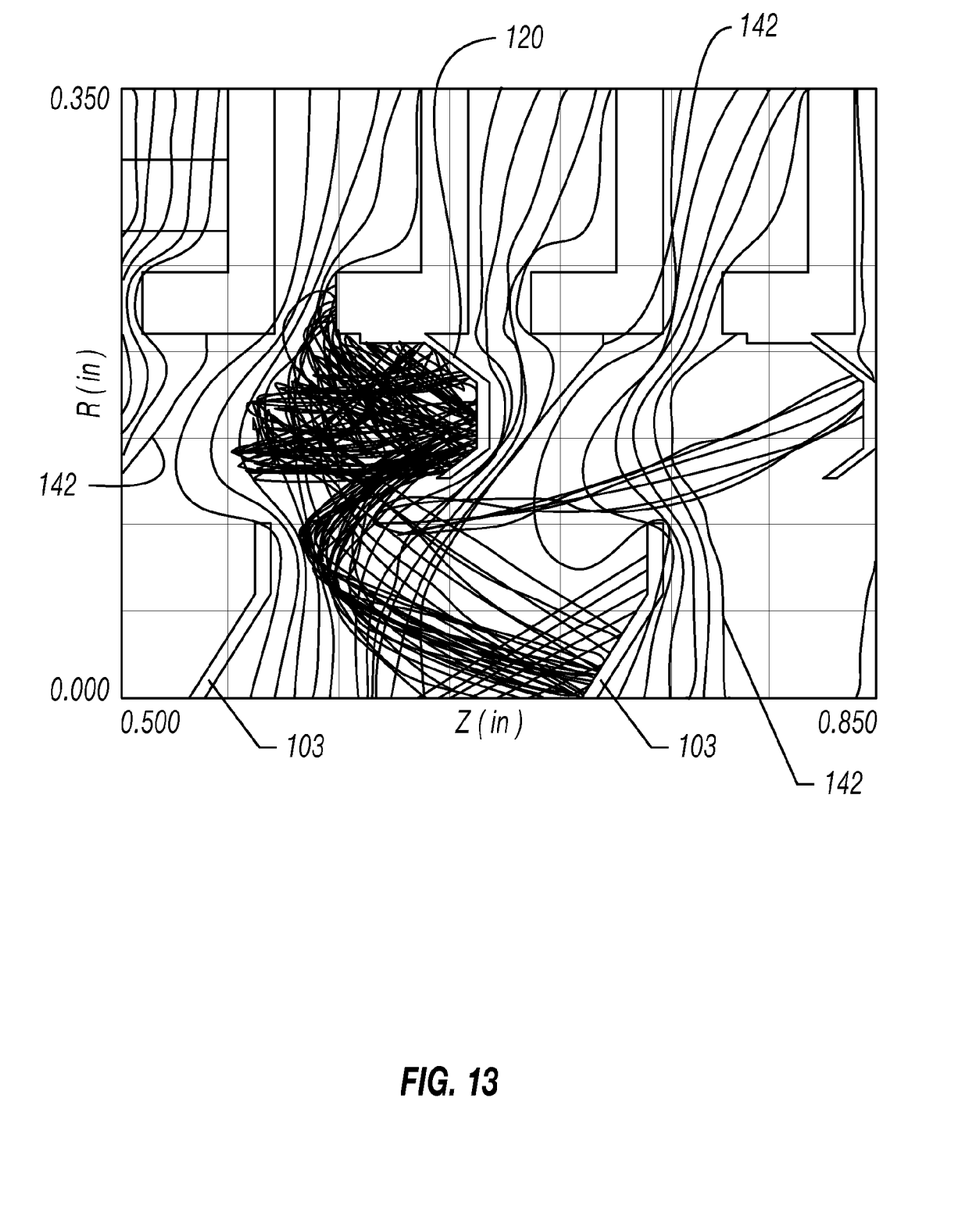
FIG. 13 is a graph showing secondary electron trajectories for 100 eV emission energies in accordance with a non-limiting example.

The secondary electron trajectories for the 10 eV and 100 eV emission energies from the second dynode 120 are shown in respective graphs of FIGS. 12 and 13. Relatively few of these trajectories reach subsequent dynodes and instead many of the trajectories are reflected back to the second dynode 120 where they have an additional chance to create low energy secondary electrons. As compared to a standard venetian blind dynode structure, the photomultiplier 100 shown in FIG. 5 has excellent single photoelectron resolution and high detection efficiency due to the efficient use of secondary electrons of various energies. It is a symmetrical photomultiplier 100 and will not have the azimuthal gain variation present in the venetian blind structures. This photomultiplier 100 provides excellent gamma-ray resolution compared to a venetian blind structure and preserves the alternating washer/insulator dynode structure that is rugged and appropriate to the well-logging environment. In this type of dynode structure, the insulator 140 is configured and similar to a ring or "washer"), thus referring to the washer/insulator structure.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A photomultiplier comprising:
   a tube;
   plurality of dynodes within said tube and comprising at least one first dynode and at least one second dynode; and
   a respective insulator between adjacent pairs of dynodes;
   said at least one first dynode comprising
      a conductive outer ring, and
      a medial conductive member coupled to said conductive outer ring in spaced relation therefrom;
   said at least one second dynode comprising
      a conductive outer ring, and
      a conductive inner ring supported within said conductive outer ring.

2. The photomultiplier according to claim 1 wherein said at least one first dynode comprises a plurality of odd numbered ones of said plurality of dynodes; and wherein said at least one second dynode comprises a plurality of even numbered ones of said plurality of dynodes.

3. The photomultiplier according to claim 1 wherein said at least one first dynode comprises at least one conductive radial support coupled between said medial conductive member and an adjacent portion of said conductive outer ring.

4. The photomultiplier according to claim 1 wherein said medial conductive member has a conical shape.

5. The photomultiplier according to claim 1 wherein said at least one second dynode comprises:
   a radially outermost sloped ring segment extending in a first longitudinal direction;
   a radially innermost sloped ring segment extending in a second longitudinal direction; and
   an intermediate flat ring segment extending between said radially outermost and radially innermost ring segments.

6. The photomultiplier according to claim 1 further comprising a cathode adjacent said plurality of dynodes.

7. The photomultiplier according to claim 1 further comprising a respective conductive grid between adjacent ones of said plurality of dynodes.

8. The photomultiplier according to claim 1 wherein said tube comprises an evacuated glass tube.

9. The photomultiplier according to claim 1 and further comprising a secondary emissive layer formed on the dynodes.

10. The photomultiplier according to claim 1 wherein the dynodes are formed from a nickel beryllium alloy.

11. The photomultiplier according to claim 1 wherein the dynodes are formed from a copper beryllium alloy.

12. The photomultiplier according to claim 1 wherein said tube comprises a brazed ceramic and metal structure.

13. A well-logging tool to be positioned in a wellbore of a subterranean formation, the well-logging tool, comprising:
   a tool housing;
   a photomultiplier carried by the tool housing, and comprising
      a tube,
      a plurality of dynodes within said tube and comprising at least one first dynode and at least one second dynode, and
      a respective insulator between adjacent pairs of dynodes,
      said at least one first dynode comprising
         a conductive outer ring, and
         a medial conductive member coupled to said conductive outer ring in spaced relation therefrom;
      said at least one second dynode comprising
         a conductive outer ring, and
         a conductive inner ring supported within said conductive outer ring.

14. The well-logging tool according to claim 13, further comprising a scintillator carried by the tool housing and coupled to said photomultiplier.

15. The well-logging tool according to claim 13 wherein said at least one first dynode comprises a plurality of odd numbered ones of said plurality of dynodes; and wherein said at least one second dynode comprises a plurality of even numbered ones of said plurality of dynodes.

16. The well-logging tool according to claim 13 wherein said at least one first dynode comprises at least one conductive radial support coupled between said medial conductive member and an adjacent portion of said conductive outer ring.

17. The well-logging tool according to claim 13 wherein said medial conductive member has a conical shape.

18. The well-logging tool according to claim 13 wherein said at least one second dynode comprises:
   a radially outermost sloped ring segment extending in a first longitudinal direction;
   a radially innermost sloped ring segment extending in a second longitudinal direction; and
   an intermediate flat ring segment extending between said radially outermost and radially innermost ring segments.

19. The well-logging tool according to claim 13 further comprising a respective conductive grid between adjacent ones of said plurality of dynodes.

20. A method of multiplying a signal in a photomultiplier comprising a tube containing a plurality of dynodes and comprising at least one first dynode and at least one second dynode and a respective insulator between adjacent pairs of dynodes, the method comprising:
   collecting electrons at the at least one first dynode comprising a conductive outer ring and a medial conductive member coupled to the conductive outer ring in spaced relation therefrom; and
   conducting electrons at the at least one second dynode comprising a conductive outer ring and a conductive inner ring supported within the conductive outer ring.

21. The method according to claim 20 wherein the at least one first dynode comprises a plurality of odd numbered ones of the plurality of dynodes and wherein the at least one second dynode comprises a plurality of even numbered ones of the plurality of dynodes.

22. The method according to claim 20 wherein the at least one first dynode comprises at least one conductive radial support coupled between the medial conductive member and an adjacent portion of the conductive outer ring.

23. The method according to claim 20 wherein the at least one second dynode comprises:
   a radially outermost sloped ring segment extending in a first longitudinal direction;
   a radially innermost sloped ring segment extending in a second longitudinal direction; and
   an intermediate flat ring segment extending between the radially outermost and radially innermost ring segments.

* * * * *